(12) United States Patent
Fakiri et al.

(10) Patent No.: US 11,465,343 B2
(45) Date of Patent: Oct. 11, 2022

(54) MANUFACTURING CONTINUOUS FIBER REINFORCED THERMOPLASTIC COMPONENTS WITH LAYERS OF UNIDIRECTIONAL TAPE

(71) Applicant: Saudi Arabian Oil Company, Dhahran (SA)

(72) Inventors: Abderrahim Fakiri, Dhahran (SA); Abdullatif Jazzar, Al-Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/717,491

(22) Filed: Dec. 17, 2019

(65) Prior Publication Data

US 2021/0178669 A1 Jun. 17, 2021

(51) Int. Cl.
*B29C 64/165* (2017.01)
*B29C 64/209* (2017.01)
(Continued)

(52) U.S. Cl.
CPC .......... *B29C 64/165* (2017.08); *B29C 64/209* (2017.08); *B29C 70/388* (2013.01); *B33Y 10/00* (2014.12); *B33Y 30/00* (2014.12)

(58) Field of Classification Search
CPC ... B29C 64/118; B29C 64/165; B29C 64/209; B29C 70/38; B29C 70/388; B33Y 10/00; B33Y 30/00
See application file for complete search history.

(56) References Cited

U.S. PATENT DOCUMENTS 3,594,247 A 7/1971 Pennington et al.
4,529,139 A 7/1985 Smith et al.
(Continued)

FOREIGN PATENT DOCUMENTS

CN 106273533 6/2018
DE 102014100711 7/2015
(Continued)

OTHER PUBLICATIONS

Frketic et al, "Automated manufacturing and processing of fiber-reinforced polymer (FRP) composites: An additive review of contemporary and modern techniques for advanced materials manufacturing," Additive Manufacturing, 14, pp. 69-86, Jan. 2017, 61 pages.

(Continued)

*Primary Examiner* — Manley L Cummins, IV
(74) *Attorney, Agent, or Firm* — Fish & Richardson P.C.

(57) ABSTRACT

A method of manufacturing continuous fiber reinforced thermoplastic components includes receiving, by a movable die, spread dry fiber tows. The method also includes receiving, by the movable die and from a polymer extruder fluidically coupled to the movable die, molten polymer. The method also include wetting, by the movable die, the spread fiber tows with the molten polymer. The method also includes maintaining, by the movable die, the wet fiber tows spread as the wet fiber tows exit the die. The method also includes depositing, by the movable die, a layer of the wet fiber tows on a printing surface. The movable die is configured to move along the printing surface to form a thermoplastic component of one or more layers of fiber tows on the printing surface.

12 Claims, 3 Drawing Sheets

(51) Int. Cl.
*B29C 70/38* (2006.01)
*B33Y 10/00* (2015.01)
*B33Y 30/00* (2015.01)

(56) References Cited

U.S. PATENT DOCUMENTS

| | | | |
|---|---|---|---|
| 4,588,538 A | 5/1986 | Chung et al. | |
| 4,749,534 A | 6/1988 | Robretson | |
| 4,822,444 A | 4/1989 | Weingart et al. | |
| 4,838,971 A | 6/1989 | Cacak | |
| 4,997,503 A | 3/1991 | Bohannan et al. | |
| 5,128,198 A | 7/1992 | Dyksterhouse | |
| 5,171,630 A | 12/1992 | Muzzy et al. | |
| 5,540,797 A | 7/1996 | Wilson | |
| 5,936,861 A * | 8/1999 | Jang | B33Y 70/00 700/98 |
| 6,179,945 B1 | 1/2001 | Greenwood et al. | |
| 6,495,091 B1 * | 12/2002 | Manson | B29C 70/38 156/245 |
| 6,558,146 B1 | 5/2003 | Shah et al. | |
| 7,815,141 B2 | 10/2010 | Uozumi et al. | |
| 7,905,442 B2 | 3/2011 | Uozumi et al. | |
| 9,757,905 B2 | 9/2017 | Harasin et al. | |
| 2002/0148553 A1 | 10/2002 | Campbell, Jr. | |
| 2014/0050862 A1 | 2/2014 | Borger | |
| 2014/0061974 A1 * | 3/2014 | Tyler | B29C 64/106 264/401 |
| 2014/0328963 A1 | 11/2014 | Mark et al. | |
| 2015/0360423 A1 | 12/2015 | Torres et al. | |
| 2016/0144566 A1 * | 5/2016 | Mark | B33Y 10/00 264/45.1 |
| 2017/0028639 A1 * | 2/2017 | Evans | B29C 48/02 |
| 2018/0065300 A1 * | 3/2018 | Tyler | B33Y 10/00 |
| 2018/0207850 A1 * | 7/2018 | Stockett | B29C 48/08 |
| 2018/0207866 A1 * | 7/2018 | Tyler | B29C 64/209 |
| 2018/0229429 A1 | 8/2018 | Tyler et al. | |
| 2018/0370129 A1 * | 12/2018 | Natale | B29C 64/314 |
| 2019/0001566 A1 * | 1/2019 | Tyler | B29C 64/291 |
| 2019/0009472 A1 * | 1/2019 | Mark | B29C 70/384 |
| 2020/0086563 A1 | 3/2020 | Budge | |
| 2020/0376781 A1 * | 12/2020 | Wadsworth | B29C 70/384 |
| 2021/0101330 A1 * | 4/2021 | Hikmet | B33Y 80/00 |
| 2021/0178659 A1 | 6/2021 | Fakiri et al. | |
| 2021/0187817 A1 | 6/2021 | Al-Hashmy et al. | |

FOREIGN PATENT DOCUMENTS

| | | | | |
|---|---|---|---|---|
| DE | 102016202053 | * | 8/2017 | |
| EP | 2324994 | | 5/2011 | |
| EP | 3219474 | | 9/2017 | |
| JP | S5547351 | | 3/1980 | |
| WO | WO 2015024363 | | 2/2015 | |
| WO | WO 2016107808 | | 7/2016 | |
| WO | WO 2017100991 | | 6/2017 | |
| WO | WO 2017137233 | | 8/2017 | |
| WO | WO-2017137233 A1 * | | 8/2017 | B29C 70/386 |
| WO | WO 2018189062 | | 10/2018 | |

OTHER PUBLICATIONS

Manz [online], "Fully Automated in a Single Process: Optimization & Manufacturing of CFRP Components," Altair, retrieved on Oct. 17, 2019, from URL: <https://www.altair.com/ResLibDownload.aspx?file_id2=3669>, 4 pages.

Yang et al, "3D printing for continuous fiber reinforced thermoplastic composites: Mechanism and performance," Rapid Prototyping Journal, vol. 23, No. 1, pp. 209-215, Jan. 2017, 7 pages.

PCT International Search Report and Written Opinion issued in International Application No. PCT/US2020/0655550 dated Mar. 12, 2021, 13 pages.

Colombo et al, "Optimization of filament winding parameters for the design of a composite pipe," Composites Part B: Engineering, vol. 148, Sep. 2018, pp. 207-216, 28 pages.

Gonzalez-Henriquez et al, "3.21 Filament Winding Applications," Comprehensive Composite Materials II, vol. 3, 2018, pp. 556-577, 22 pages.

Koustas et al, "On the development of a filament winding robotic system," Procedia Manufacturing, vol. 17, 2018, pp. 919-926, 8 pages.

Minsch et al, "Analysis of Filament Winding Processes and Potential Equipment Technologies," Procedia CIRPvol. 66, 2017, pp. 125-130, 6 pages.

Munro, "Review of manufacturing of fiber composite components by filament winding" Polymer Composites, vol. 9, issue 5, pp. 352-359, Oct. 1988, 8 pages.

PCT International Search Report and Written Opinion in International Appln. No. PCT/US2020/065531, dated Mar. 29, 2021, 14 pages.

PCT International Search Report and Written Opinion in International Appln. No. PCT/US2020/065545, dated Mar. 29, 2021, 15 pages.

* cited by examiner

MANUFACTURING CONTINUOUS FIBER REINFORCED THERMOPLASTIC COMPONENTS WITH LAYERS OF UNIDIRECTIONAL TAPE

FIELD OF THE DISCLOSURE

This disclosure relates to manufacturing plastics, in particular, to methods and equipment for manufacturing thermoplastics.

BACKGROUND OF THE DISCLOSURE

Thermoplastic components can be made with continuous reinforced fibers, such as carbon fiber, glass fiber, or aramid fiber. Thermoplastic components exhibit high stiffness-to-weight ratios and other mechanical properties that make them desirable in multiple applications. Manufacturing thermoplastic components can be costly and time-consuming. Methods and systems for manufacturing thermoplastic components are sought.

SUMMARY

Implementations of the present disclosure include a method of manufacturing continuous fiber reinforced thermoplastic components. The method includes receiving, by a movable die, spread dry fiber tows. The method also includes receiving, by the movable die and from a polymer extruder fluidically coupled to the movable die, molten polymer. The method also include wetting, by the movable die, the spread fiber tows with the molten polymer. The method also includes maintaining, by the movable die, the wet fiber tows spread as the wet fiber tows exit the die. The method also includes depositing, by the movable die, a layer of the wet fiber tows on a printing surface. The movable die is configured to move along the printing surface to form a thermoplastic component of one or more layers of fiber tows on the printing surface.

In some implementations, the method also includes changing, by the movable die, a thickness of the layer of the wet fiber tows. In some implementations, changing the thickness of the layer of the wet fiber tows includes changing a size of an outlet of the movable die.

In some implementations, wetting the spread fiber tows includes generally uniformly contacting the fiber tows with the molten polymer.

In some implementations, the movable die includes an interior channel configured to receive the molten polymer from a polymer extruder fluidically coupled to the movable die. Wetting the fiber tows with the molten polymer includes wetting the fiber tows at the interior channel before the fiber tows leave the movable die.

In some implementations, receiving the spread dry fiber tows includes receiving, at the interior channel, the dry fiber tows where the dry fiber tows meet the molten polymer.

In some implementations, receiving the dry fiber tows at the interior channel includes receiving, at a merging point disposed between 10 to 50 millimeters away from an outlet of the movable die, the dry fiber tows. Maintaining the wet fiber tows spread includes passing the wet and spread fiber tows from the merging point to the outlet of the movable die.

In some implementations, wetting the fiber tows includes flowing the molten polymer along the interior channel and passing the fiber tows along the interior channel simultaneously.

In some implementations, the movable die is coupled to an additive manufacturing actuator system configured to move the movable die. Depositing the layer of the wet fiber tows includes depositing layers of the wet fiber tows on the printing surface to form a preform object in a semi-consolidated state.

Implementations of the present disclosure also include a method that includes receiving, by a movable die, dry fiber tows. The method also includes wetting, by the movable die, the fiber tows with molten polymer. The method also includes depositing, by the movable die, at least one layer of the wet fiber tows on a printing surface. The movable die is configured to move along the printing surface to form a thermoplastic component of one or more layers of fiber tows on the printing surface.

In some implementations, receiving the fiber tows includes receiving the fiber tows spread from a fiber spreader. In some implementations, the method also includes, after wetting the fiber tows, maintaining, by the movable die, the wet fiber tows spread as the wet fiber tows move to leave the die.

In some implementations, the movable die includes an interior channel. Receiving the dry fiber tows includes receiving the dry fiber tows at the interior channel, and wetting the fiber tows includes wetting the fiber tows with the molten polymer at the interior channel.

In some implementations, the method also includes, before wetting the fiber tows, receiving, by the movable die and from a polymer extruder fluidically coupled to interior channel of the movable die, molten polymer.

Implementations of the present disclosure also include an apparatus for manufacturing thermoplastic components. The apparatus includes a fiber spreader configured to spread dry fiber tows, a polymer extruder, a printing surface, and a movable die. The movable die includes an interior channel fluidically coupled to the polymer extruder to receive molten polymer from the polymer extruder. The movable die receives the spread dry fiber tows from the fiber spreader. The movable die wets, at the interior channel, the fiber tows with the molten polymer. The movable die deposits a layer of the wet fiber tows on the printing surface to form a thermoplastic component of one or more layers of fiber tows on the printing surface.

In some implementations, the apparatus also includes an additive manufacturing actuator system coupled to the movable die. The additive manufacturing actuator system is configured to move the movable die along the printing surface to deposit layers of the wet fiber tows on the printing surface to form a preform object in a semi-consolidated state.

In some implementations, the movable die further includes an adjustable outlet through which the layer of the wet fiber tows leaves the movable die. The adjustable outlet configured to change a thickness of the layer of the wet fiber tows. In some implementations, the movable die includes a cantilevered lip defining, with a body of the movable die, the adjustable outlet. The cantilevered lip is configured to move with respect to the body of the movable die to change a size of the adjustable outlet. In some implementations, the interior channel of the movable die further includes a merging portion. The merging portion of the interior channel is configured to receive the dry fiber tows to wet the dry fiber tows with the molten polymer. The merging portion is disposed about 10 to 50 millimeters from the adjustable outlet of the movable die such that the wet fiber tows travel 10 to 50 millimeters along the die before exiting the movable die to help prevent the wet fiber tows from mingling before exiting the movable die.

In some implementations, the movable die further includes a distribution manifold upstream of the merging portion. The distribution manifold distributes the molten polymer before the polymer reaches the merging portion.

DETAILED DESCRIPTION OF THE DISCLOSURE

The present disclosure describes printing methods and equipment for manufacturing thermoplastic preforms and components by simultaneously making and printing continuous fiber unidirectional (UD) tape. The equipment includes a movable die that receives continuous fiber tows and wets the fiber tows with molten polymer before depositing layers of the wet fiber tows on a printing surface. The movable die is connected to an additive manufacturing actuator system that moves the die to deposit layers of the wet fiber tows on the printing surface to form two-dimensional thermoplastic components.

Particular implementations of the subject matter described in this specification can be implemented so as to realize one or more of the following advantages. For example, making UD tape and printing the UD tape to make near-shape thermoplastic preform or components using the printing apparatus of the present disclosure reduces the number of steps required in conventional manufacturing. The method of the present disclosure reduces the number of manufacturing steps by merging the pultrusion, tape laying, lamination, and trimming steps into one step.

Figure 1:
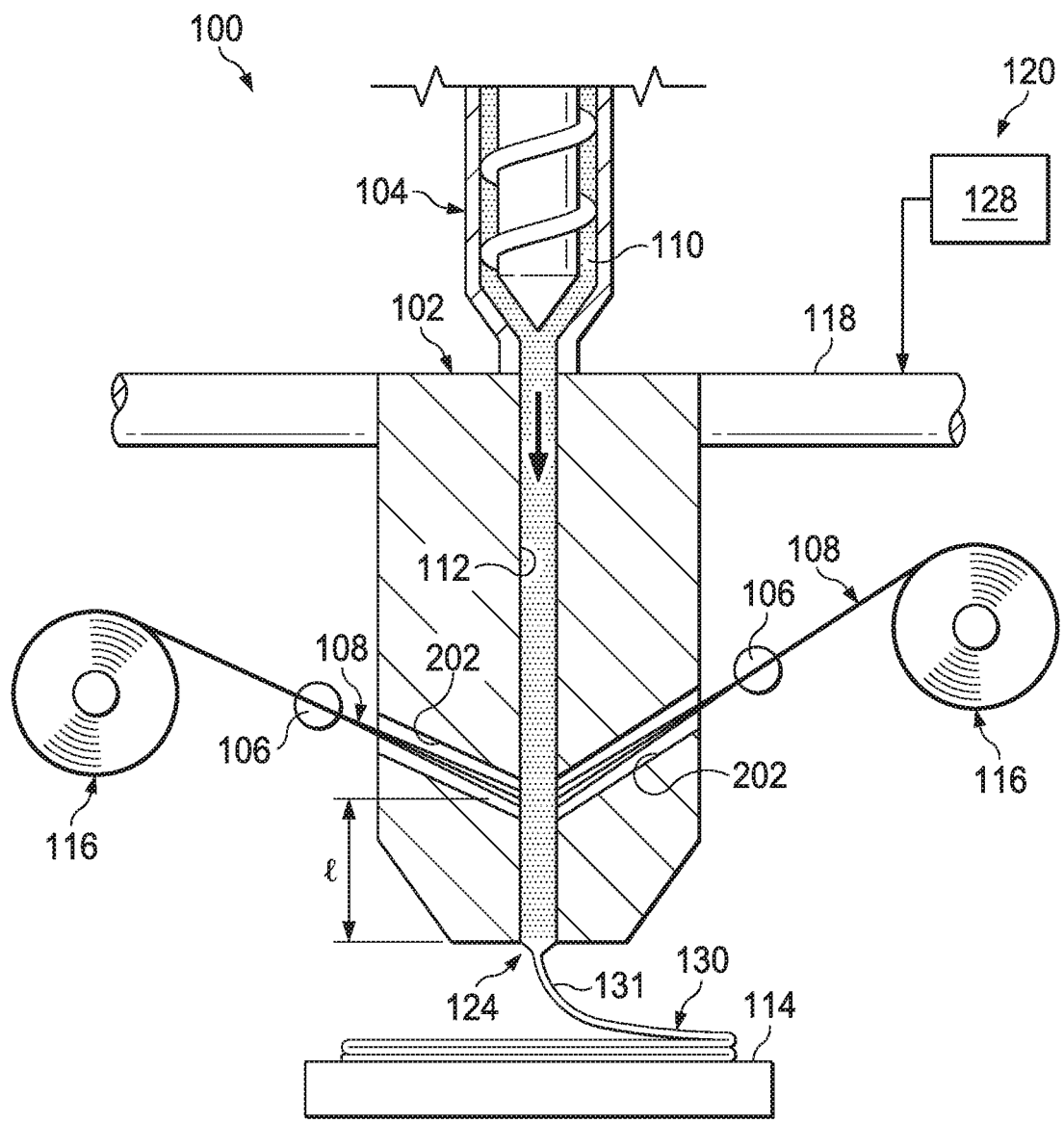
FIG. 1 is a front schematic view of a printing apparatus for manufacturing thermoplastic preforms.

FIG. 1 shows a printing apparatus 100 for manufacturing thermoplastic components 130. The thermoplastic components 130 can be, for example, thermoplastic preforms in a semi-consolidated state. By 'semi-consolidated state', it is meant that the interlayers of the preform might not be fully bonded. The manufacturing apparatus 100 includes a movable die 102, a polymer extruder 104 fluidically coupled to the movable die 102, one or more fiber spreaders 106, a printing surface 114 (for example, a printing bed), and an additive manufacturing actuator system 120 (for example, a gantry or a multi-axis robotic system) coupled to the die 102. The additive manufacturing actuator system 120 includes one or more actuators 118 (for example, linear actuators) and a processing device 128 (for example, a computer) communicatively coupled to the actuators 118. The processing device 118 has additive manufacturing software to control the actuators 118 to move the die 102 along the printing surface 114 to deposit layers 131 of wet fiber tows 108 on the printing surface 114. The die 102 is moved to deposit layers 131 to form two-dimensional or three-dimensional thermoplastic components 130. For example, the die 102 can print or form preform objects (for example, near-shape laminate) in a semi-consolidated state. Full consolidation can take place in later steps (for example, during the forming step or the over molding step).

The fiber spreaders 106 spread dry fiber tows or bundles 108 received from a fiber roll 116. The fiber tows 108 can be made, for example, of carbon fiber. The printing apparatus 100 can include two fiber spreaders 106, with the die 102 disposed between the two fiber spreaders 106 to receive the respective spread fiber tows 108. The spread fiber tows 108 enter the die 102 from two opposite sides of the die 102. The fiber tows 108 enter the die 102 through respective side openings 202 to be wetted with a thermoplastic melted polymer 110 (for example, a matrix material such as polyethylene resin) inside the die 102 and then deposited on the printing surface 114.

The movable die 102 has an interior channel 112 fluidically coupled to the polymer extruder 104 to receive the molten polymer 110 from the polymer extruder 104. The fiber tows 18 enter the interior channel 112 to be wetted with the polymer 110 and then exit the die 102 through an exit 124 or outlet of the die 102. The molten polymer 110 flows along the channel toward the spread fiber tows 108 to wet or impregnate the fiber tows 108 at the interior channel 112. The wet fiber tows 108 form a layer 131 of continuous UD tape that the die 102 lays or deposits on the printing surface 114. The die 102 forms thermoplastic components 130 with multiple layers 131 of continuous UD tape. For example, the die 102 deposits the first layer and then waits for the layer to dry and stick to the printing surface 114. The dry layer acts as an anchor to pull the subsequent fiber layers during the tape laying process. The die 102 moves along the printing surface 114 to form thermoplastic components 130 of one or more layers 131 of wet fiber tows on the printing bed 114.

Figure 2:
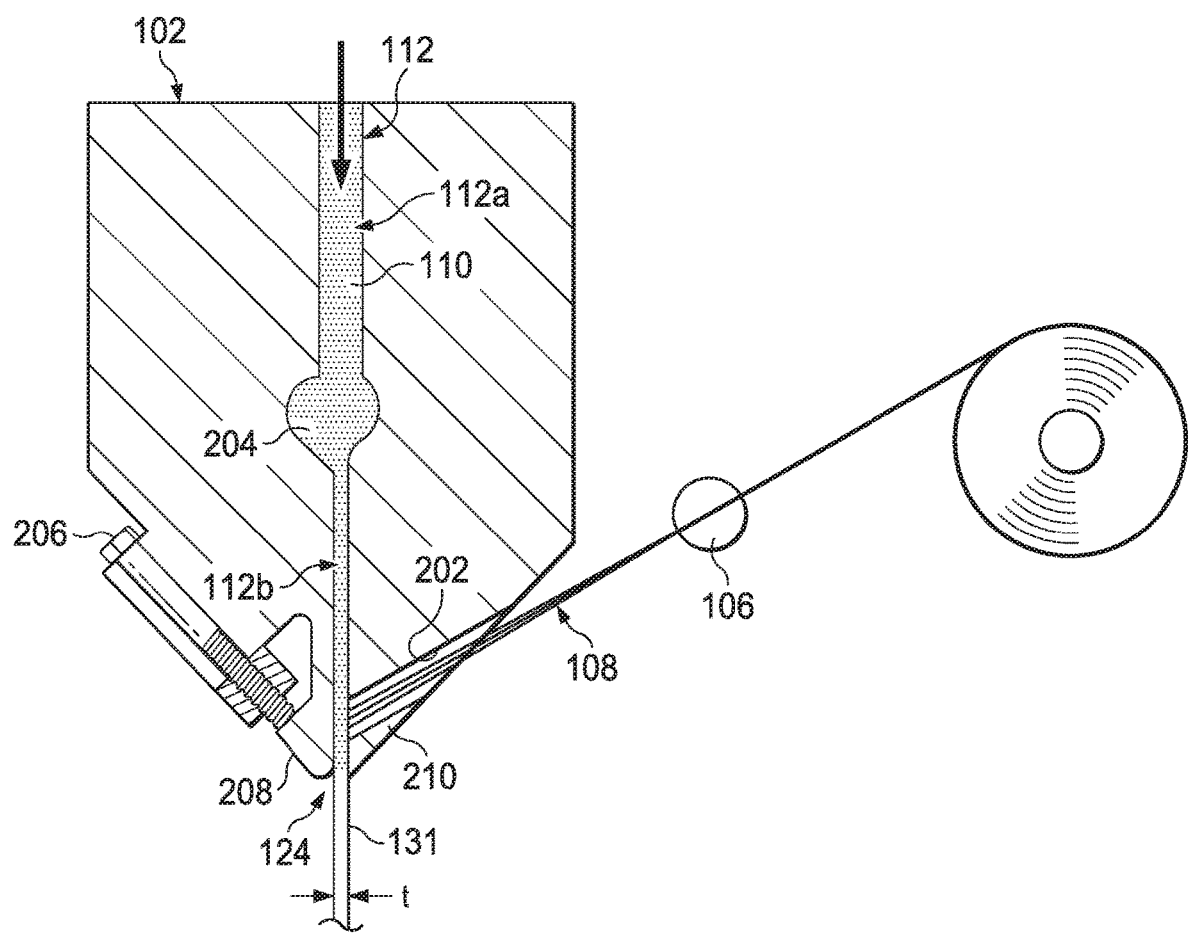
FIG. 2 is a front schematic view of a portion of the printing apparatus of FIG. 1.

FIG. 2 shows a portion of the movable die 102 with an adjustable outlet 124. The movable die 102 defines the outlet 124 between a cantilevered lip 208 and a body 210 or wall of the die 102 at an end of the die 102. The layer 131 of the wet fiber tows leaves the movable die 102 through the adjustable outlet 124 to land on the printing surface 114. The adjustable outlet 124 can change a thickness 't' of the layer 131 of the wet fiber tows. For example, the cantilevered lip 208 is moved or flexed by a screw 206 (for example, an adjustable push screw) attached to the die 102. The screw 206 moves the cantilevered lip 208 with respect to the body 210 of the die 102 to change a size of the adjustable outlet 124 to change the thickness 't' of the layer 131. For example, the screw 206 can push the far end of the cantilevered lip 208 toward the body 210 of the die 102 to narrow the gap between the cantilevered lip 208 and the body 210 of the die 102, or retract to release the cantilevered lip 208 and widen the gap between the cantilevered lip 208 and the body 210 of the die 102.

The die 102 can also include a distribution manifold 204 upstream of the outlet 124. By upstream, it is meant that the distribution manifold 204 is disposed in an opposite direction or location, with respect to the outlet 124, from the direction in which the molten polymer 110 flows. The distribution manifold 204 is disposed between a first portion 112a of the interior channel 112 and a second portion 112b of the interior channel 112. The first portion 112a of the interior channel 112 can have a circular cross-section and the second portion 112b of the channel 112 can have a rectangular cross-section (or another flat cross-section) to spread or distribute the molten polymer 110 before reaching the spread dry fiber tows 108 to uniformly contact and wet the fiber tows 108.

Referring back to FIG. 1, the interior channel 112 of the die 102 has a merging point 'P' (for example, a merging portion or station) where the dry fiber tows 108 meet the molten polymer 110. The channel 112 can receive the dry fiber tows 108 at the merging point 'P' to wet the fiber tows 108 with the molten polymer 110. The wet fiber tows 108 are preferably kept spread when disposed on the printing surface 114 to form quality products. To help prevent the wet fiber tows from mingling before exiting the die 102, the merging point 'P' is disposed about 10 to 50 millimeters from the adjustable outlet 124 of the die 102 such that the wet fiber tows travel a length 'l' of about 10 to 50 millimeters (preferably between 10 to 25 millimeters) along the die before exiting the die 102. Such a short travel distance allows the wet fibers to remain spread when deposited on the printing surface 114. In some implementations, the adjustable outlet 124 of the die 102 can adjust the thickness of the layer 131 to help prevent the fibers from mingling before being deposited on the printing surface 114.

Figure 3:
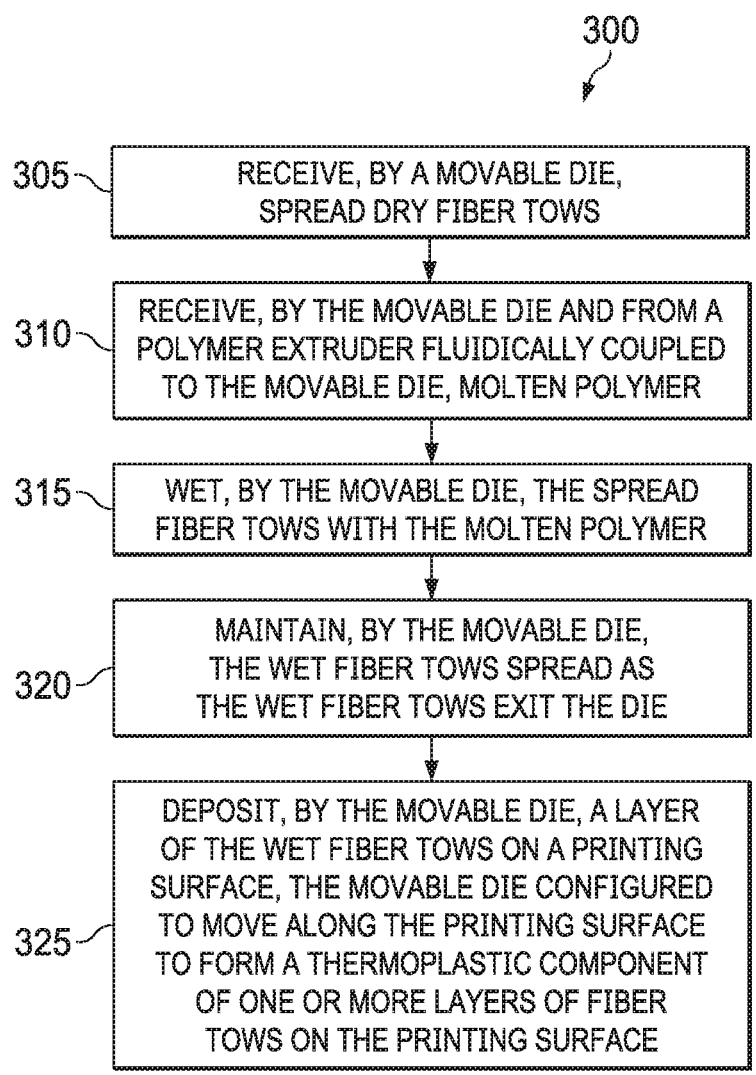
FIG. 3 is a flow chart of an example method of manufacturing thermoplastic components.

FIG. 3 shows an example method of manufacturing thermoplastic components (for example, the thermoplastic component 130 of FIG. 1). The method includes receiving, by a movable die, spread dry fiber tows (305). The method also includes receiving, by the movable die and from a polymer extruder fluidically coupled to the movable die, molten polymer (310). The method also includes wetting, by the movable die, the spread fiber tows with the molten polymer (315). The method also includes maintaining, by the movable die, the wet fiber tows spread as the wet fiber tows exit the die (320). The method also includes depositing, by the movable die, a layer of the wet fiber tows on a printing surface, where the movable die is configured to move along the printing surface to form a thermoplastic component of one or more layers of fiber tows on the printing surface (325).

Although the following detailed description contains many specific details for purposes of illustration, it is understood that one of ordinary skill in the art will appreciate that many examples, variations and alterations to the following details are within the scope and spirit of the disclosure. Accordingly, the exemplary implementations described in the present disclosure and provided in the appended figures are set forth without any loss of generality, and without imposing limitations on the claimed implementations.

Although the present implementations have been described in detail, it should be understood that various changes, substitutions, and alterations can be made hereupon without departing from the principle and scope of the disclosure. Accordingly, the scope of the present disclosure should be determined by the following claims and their appropriate legal equivalents.

The singular forms "a", "an" and "the" include plural referents, unless the context clearly dictates otherwise.

As used in the present disclosure and in the appended claims, the words "comprise," "has," and "include" and all grammatical variations thereof are each intended to have an open, non-limiting meaning that does not exclude additional elements or steps.

As used in the present disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

What is claimed is:

1. A method of manufacturing continuous fiber reinforced thermoplastic components, the method comprising:
   spreading, by a first fiber spreader, a first bundle of dry fiber tows to form a first set of spread fiber tows;
   spreading, by a second fiber spreader, a second bundle of dry fiber tows to form a second set of spread fiber tows;
   receiving, by and through a first side of a movable die, the first set of spread dry fiber tows, the first set of spread dry fiber tows comprising fibers spread by the first fiber spreader,
   receiving, by and through a second side of the movable die, the second side opposite the first side of the moveable die, the second set of spread dry fiber tows, the second set of spread dry fiber tows comprising fibers spread by the second fiber spreader;
   receiving, by the movable die and from a polymer extruder fluidically coupled to the movable die, molten polymer;
   wetting, by the movable die, the first set of spread dry fiber tows and the second set of spread dry fiber tows with the molten polymer to form a first set of spread wet fiber tows and a second set of spread wet fiber tows, respectively,
   maintaining, by the movable die, the first set of spread wet fiber tows and the second set of spread wet fiber tows spread as the first set of spread wet fiber tows and the second set of spread wet fiber tows exit the moveable die;
   depositing, by the movable die, a layer of the first set of spread wet fiber tows and the second set of spread wet fiber tows on a printing surface, the movable die configured to move along the printing surface to form a thermoplastic component of one or more layers on the printing surface;
   changing, by the movable die, a thickness of the layer of the first set of spread wet fiber tows and the second set of spread wet fiber tows; and
   wherein the movable die defines an outlet between a cantilevered lip and a body or wall of the movable die at an end of the moveable die, wherein the cantilevered lip is movable by an adjustable screw, wherein changing the layer of the first set of spread wet fiber tows and the second set of spread wet fiber tows comprises changing a size of the outlet of the movable die by moving the adjustable screw.

2. The method of claim 1, wherein wetting the first set of spread fiber tows and the second set of spread dry fiber tows comprises generally uniformly contacting the first set of spread dry fiber tows and the second set of spread dry fiber tows with the molten polymer.

3. The method of claim 1, wherein the movable die comprises an interior channel configured to receive the molten polymer from the polymer extruder fluidically coupled to the movable die, and wherein wetting the first set of spread dry fiber tows and the second set of spread dry fiber tows with the molten polymer comprises wetting the first set of spread dry fiber tows and the second set of spread dry fiber tows at the interior channel before the first set of spread wet fiber tows and the second set of spread wet fiber tows exit the movable die.

4. The method of claim 3, wherein receiving the first set of spread dry fiber tows and the second set of spread dry fiber tows comprises receiving, at the interior channel, the first set of spread dry fiber tows and the second set of spread dry fiber tows where the first set of spread dry fiber tows and the second set of spread dry fiber tows meet the molten polymer.

5. The method of claim 4, wherein receiving the first set of spread dry fiber tows and the second set of spread dry fiber tows at the interior channel comprises receiving, at a merging point disposed between 10 to 50 millimeters away from the outlet of the movable die, the first set of spread dry fiber tows and the second set of spread dry fiber tows, and wherein maintaining the first set of spread wet fiber tows and the second set of spread wet fiber tows spread comprises passing the first set of spread wet fiber tows and the second set of spread wet fiber tows from the merging point to the outlet of the movable die.

6. The method of claim 3, wherein wetting the first set of the spread dry fiber tows and the second set of spread dry fiber tows comprises flowing the molten polymer along the interior channel and passing the first set of spread dry fiber tows and the second set of spread dry fiber tows along the interior channel simultaneously.

7. The method of claim 1, wherein the movable die is coupled to an additive manufacturing actuator system configured to move the movable die, and wherein the thermoplastic component is a preform object in a semi-consolidated state.

8. The method of claim 1, wherein maintaining the first set of spread wet fiber tows and the second set of spread wet fiber tows spread comprises preventing the fibers of the first set of dry fiber tows and fibers of the second set of dry fiber tows from mingling before exiting the moveable die.

9. A method comprising:
spreading, by two fiber spreaders, two respective bundles of dry fiber tows;
receiving, by and through opposite sides of a movable die, fibers spread by the two fiber spreaders from the two respective bundles of dry fiber tows;
wetting, by the movable die, the fibers with molten polymer to form wet fiber tows; and
depositing, by the movable die, at least one layer of the wet fiber tows on a printing surface, the movable die configured to move along the printing surface to form a thermoplastic component of one or more layers of wet fiber tows on the printing surface
wherein the movable die defines an outlet between a cantilevered lip and a body or wall of the movable die at an end of the movable die, wherein the cantilevered lip is movable by an adjustable screw, wherein the method further comprises moving the adjustable screw to change a size of the outlet of the movable die, wherein changing the size of the outlet changes a thickness of the one or more layers of wet fiber tows on the printing surface.

10. The method of claim 9, further comprising, after wetting the fibers, maintaining, by the movable die, the wet fiber tows spread as the wet fiber tows move to leave the movable die.

11. The method of claim 9, wherein the movable die comprises an interior channel and wherein receiving the fibers comprises receiving the fibers at the interior channel, and wherein wetting the fibers comprises wetting the fibers with the molten polymer at the interior channel.

12. The method of claim 11, further comprising, before wetting the fibers, receiving, by the movable die and from a polymer extruder fluidically coupled to interior channel of the movable die, the molten polymer.

* * * * *